United States Patent [19]

Terashima et al.

[11] Patent Number: 5,779,933

[45] Date of Patent: Jul. 14, 1998

[54] LIQUID CRYSTAL COMPOSITION AND LIQUID CRYSTAL DISPLAY ELEMENT

[75] Inventors: Kanetsugu Terashima, Yasu-gun; Fusayuki Takeshita, Kimitsu; Hitoshi Yamamoto; Hiroaki Kawasyukuda, both of Yasu-gun, all of Japan

[73] Assignee: Chisso Corporation, Osaka, Japan

[21] Appl. No.: 663,226

[22] PCT Filed: Feb. 1, 1996

[86] PCT No.: PCT/JP96/00193

§ 371 Date: Jun. 17, 1996

§ 102(e) Date: Jun. 17, 1996

[87] PCT Pub. No.: WO96/34071

PCT Pub. Date: Oct. 31, 1996

[30] Foreign Application Priority Data

Apr. 25, 1995 [JP] Japan .................. 7-101232

[51] Int. Cl.⁶ .................. C09K 19/52; G02F 1/13
[52] U.S. Cl. .................. 252/299.1; 252/299.61; 252/299.63; 252/299.64; 252/299.66; 252/299.67; 349/182
[58] Field of Search .................. 252/299.01, 299.61, 252/299.63, 299.64, 299.66, 299.67

[56] References Cited

U.S. PATENT DOCUMENTS

| | | | |
|---|---|---|---|
| 4,917,818 | 4/1990 | Sawada et al. | 252/299.61 |
| 5,013,477 | 5/1991 | Buchecker et al. | 252/299.63 |
| 5,030,383 | 7/1991 | Scheuble et al. | 252/299.61 |
| 5,230,826 | 7/1993 | Boller et al. | 252/299.61 |
| 5,258,135 | 11/1993 | Uchida et al. | 252/299.63 |
| 5,288,427 | 2/1994 | Weber et al. | 252/299.61 |
| 5,358,662 | 10/1994 | Hirose et al. | 252/299.63 |
| 5,374,374 | 12/1994 | Weber et al. | 252/299.63 |
| 5,387,369 | 2/1995 | Weber et al. | 252/299.01 |
| 5,560,865 | 10/1996 | Nakagawa et al. | 252/299.01 |

FOREIGN PATENT DOCUMENTS

| | | |
|---|---|---|
| 63-502599 | 9/1988 | Japan . |
| 1-151531 | 6/1989 | Japan . |
| 1-157925 | 6/1989 | Japan . |
| 1-502274 | 8/1989 | Japan . |
| 2-502921 | 9/1990 | Japan . |
| 3-17185 | 1/1991 | Japan . |
| 3-63621 | 3/1991 | Japan . |
| 4-54154 | 2/1992 | Japan . |
| 4-220489 | 8/1992 | Japan . |
| 4-311793 | 11/1992 | Japan . |
| 5-125363 | 5/1993 | Japan . |
| 5-148483 | 6/1993 | Japan . |
| 5-286873 | 11/1993 | Japan . |
| 6-25667 | 2/1994 | Japan . |
| 6-108053 | 4/1994 | Japan . |
| 6-279760 | 10/1994 | Japan . |
| WO89/03867 | 5/1989 | WIPO . |

Primary Examiner—Shean C. Wu
Attorney, Agent, or Firm—Wenderoth, Lind & Ponack

[57] ABSTRACT

A liquid crystal composition which comprises 1 to 15% of a first component (a compound selected from compounds of the formulae I-a and I-b), 8 to 40% of a second component (a compound of the formula II), 10 to 30% of a third component (a compound of the formula III), and 10 to 45% of a fourth component (a compound selected from compounds of the formulae IV-a, IV-b, IV-c and IV-d)

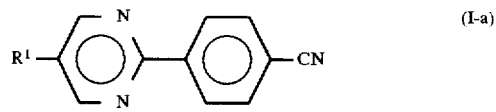

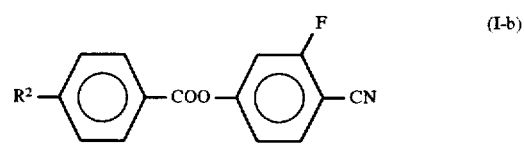

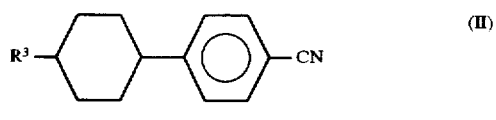

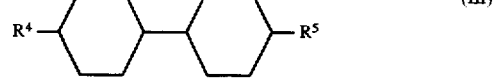

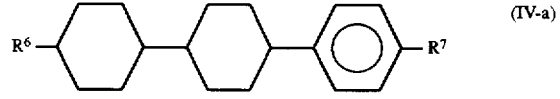

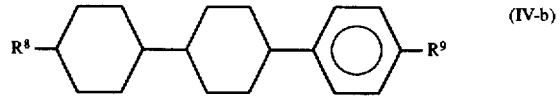

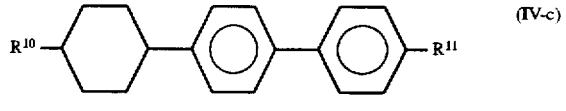

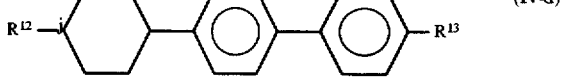

wherein each of $R^1$, $R^2$, $R^8$ and $R^{12}$ is a $C_1$–$C_{10}$ alkyl group, $R^3$ is a $C_1$–$C_{10}$ alkyl group or a $C_2$–$C_{10}$ alkenyl group, each of $R^4$, $R^7$ and $R^{11}$ is a $C_1$–$C_{10}$ alkyl group or alkoxy group, each of $R^5$ and $R^9$ is a $C_2$–$C_{10}$ alkenyl group or alkenyloxy group, each of $R^6$ and $R^{10}$ is a $C_2$–$C_{10}$ alkenyl group, and $R^{13}$ is a $C_2$–$C_{10}$ alkoxyalkyl group.

16 Claims, No Drawings

LIQUID CRYSTAL COMPOSITION AND LIQUID CRYSTAL DISPLAY ELEMENT

TECHNICAL FIELD

The present invention relates to a liquid crystal composition for liquid crystal display and a liquid crystal display element using this composition. More specifically, it relates to a nematic liquid crystal composition for liquid crystal display of a super twisted nematic (STN) system and a liquid crystal display element using this composition.

BACKGROUND ART

With the development of information equipment, particularly portable terminal equipment in recent years, the demand for a small, thin and low electric power consumption type display element which can maintain such display capacity and display quality as in a conventional CRT has increased more and more. Accordingly, liquid crystal display using a super twisted nematic (STN) system as a display system has mainly been employed. This system has been suggested by T. J. Scheffer et al. in 1984, and it is an epoch-making system beyond the limit of a twisted nematic (TN) system having a twist angle of 90° which has heretofore widely been used as the liquid crystal display system. That is to say, it has been reported that, in the STN system, the twist angle is set between 180° and 270° and the birefringence effect of a liquid crystal cell is utilized, whereby a better contrast and a wider view angle than the TN system having a twist angle of 90° can be obtained and even if a duty number is increased (to 1/480 duty), the deterioration of display quality does not occur [e.g., refer to T. J. Scheffer et al., Appln. Phys. Lett., Vol. 45, p. 1021 (1984)].

The characteristics currently required for a liquid crystal material which can be used in this STN system are that electro-optic properties are steep to obtain a high contrast, that viscosity is low to obtain a high-speed response, that the dependence of threshold voltage on temperature is low to obtain a uniform display screen without display unevenness due to the nonuniform heat distribution of a back light (for the achievement of this purpose, an NI transition temperature is required to be high), that voltage holding ratio is low to eliminate the display unevenness on the display screen due to contaminants taken in during a step such as the assembly of a panel and to remove display failure such as a baking (after image) phenomenon caused by long-time lighting, and that a d/p margin is broad to heighten the yield of panel manufacture (for the achievement of this purpose, a pretilt is required to be high).

DISCLOSURE OF THE INVENTION

Heretofore, in order to develop a liquid crystal composition having a high contrast and a low viscosity, various investigations have been conducted (refer to Japanese Patent Application Laid-open No. Hei 5-125363 and the like), but it has been difficult to obtain the satisfactory liquid crystal composition. Under such circumstances, the present invention has been intended, and an object of the present invention is to provide a liquid crystal display element which is equipped with a uniform display screen having a high contrast and a high-speed response and not having any display unevenness and which enables a high manufacture yield. Another object of the present invention is to provide a liquid crystal composition which can realize the above-mentioned characteristics.

The present inventors have intensively investigated to solve the above-mentioned problems, and as a result, it has been found that a specific liquid crystal composition suitable for an STN system can achieve these objects.

A liquid crystal composition of the present invention comprises each of the following constitutions.

(1) A liquid crystal composition which comprises 1 to 15% by weight of at least one compound as a first component selected from the group consisting of compounds represented by the formulae (I-a) and (I-b), 8 to 40% by weight of at least one compound as a second component selected from the group consisting of compounds represented by the formula (II), 10 to 30% by weight of at least one compound as a third component selected from the group consisting of compounds represented by the formula (III), and 10 to 45% by weight of at least one compound as a fourth component selected from the group consisting of compounds represented by the formulae (IV-a), (IV-b), (IV-c) and (IV-d), said first component being a compound represented by the formula (I-a)

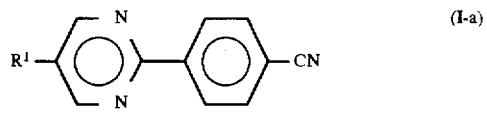

wherein $R^1$ is an alkyl group having 1 to 10 carbon atoms, or a compound represented by the formula (I-b)

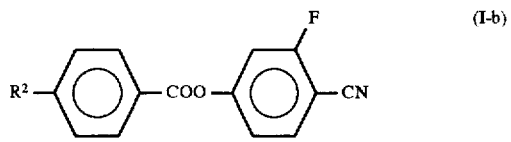

wherein $R^2$ is an alkyl group having 1 to 10 carbon atoms, said second component being a compound represented by the formula (II)

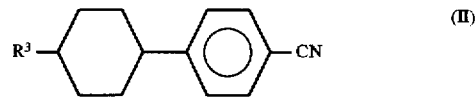

wherein $R^3$ is an alkyl group having 1 to 10 carbon atoms or an alkenyl group having 2 to 10 carbon atoms, said third component being a compound represented by the formula (III)

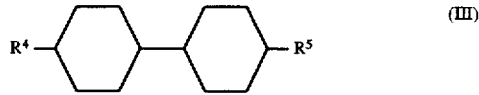

wherein $R^4$ is an alkyl group or an alkoxy group having 1 to 10 carbon atoms, and $R^5$ is an alkenyl group or an alkenyloxy group having 2 to 10 carbon atoms, said fourth component being a compound represented by the formula (IV-a)

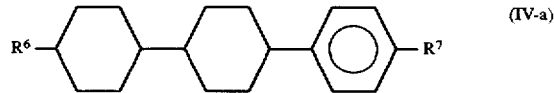

wherein $R^6$ is an alkenyl group having 2 to 10 carbon atoms, and $R^7$ is an alkyl group or an alkoxy group having 1 to 10 carbon atoms, a compound represented by the formula (IV-b)

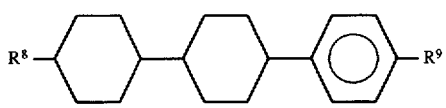

wherein $R^8$ is an alkyl group having 1 to 10 carbon atoms, and $R^9$ is an alkenyl group or an alkenyloxy group having 2 to 10 carbon atoms, a compound represented by the formula (IV-c)

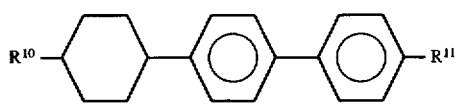

wherein $R^{10}$ is an alkenyl group having 2 to 10 carbon atoms, and $R^{11}$ is an alkyl group or an alkoxy group having 1 to 10 carbon atoms, or a compound represented by the formula (IV-d)

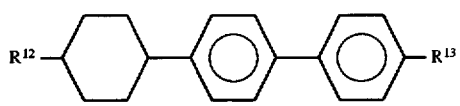

wherein $R^{12}$ is an alkyl group having 1 to 10 carbon atoms, and $R^{13}$ is an alkoxyalkyl group having 2 to 10 carbon atoms.

(2) The liquid crystal composition according to the above-mentioned paragraph (1) which further contains 5 to 25% by weight of at least one compound as a fifth component selected from the group consisting of compounds represented by the formula (V), said fifth component being a compound represented by the formula (V)

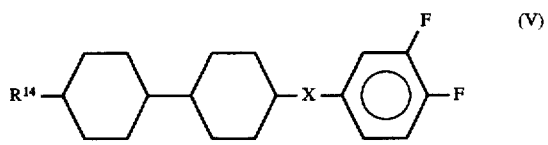

wherein R is an alkyl group having 1 to 10 carbon atoms or an alkenyl group having 2 to 10 carbon atoms, and X is a single bond or —COO—.

(3) The liquid crystal composition according to the above-mentioned paragraph (1) or (2) which further contains 1 to 10% by weight of at least one compound as a sixth component selected from the group consisting of compounds represented by the formula (VI), said sixth component being a compound represented by the formula (VI)

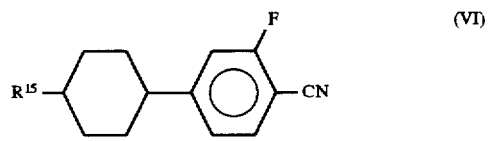

wherein $R^{15}$ is an alkoxyalkyl group having 2 to 10 carbon atoms.

(4) The liquid crystal composition according to any one of the above-mentioned paragraphs (1) to (3) which further contains 1 to 15% by weight of at least one compound as a seventh component selected from the group consisting of compounds represented by the formula (VII), said seventh component being a compound represented by the formula (VII)

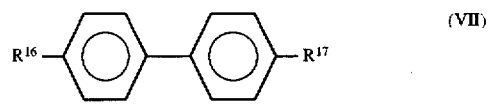

wherein each of $R^{16}$ and $R^{17}$ is independently an alkyl group or an alkoxy group having 1 to 10 carbon atoms or an alkenyl group having 2 to 10 carbon atoms.

(5) The liquid crystal composition according to any one of the above-mentioned paragraphs (1) to (4) which further contains 1 to 10% by weight of at least one compound as a eighth component selected from the group consisting of compounds represented by the formula (VIII), said eighth component being a compound represented by the formula (VIII)

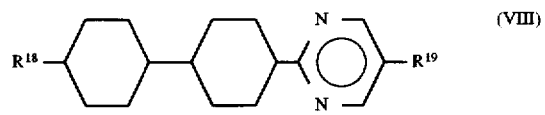

wherein $R^{18}$ is an alkyl group having 1 to 10 carbon atoms or an alkenyl group having 2 to 10 carbon atoms, and $R^{19}$ is an alkyl group having 1 to 10 carbon atoms.

(6) The liquid crystal composition according to any one of the above-mentioned paragraphs (1) to (5) which comprises a compound represented by the formula (I-a) wherein $R^1$ is an alkyl group having 1 to 7 carbon atoms, a compound represented by the formula (I-b) wherein $R^2$ is an alkyl group having 1 to 7 carbon atoms, a compound represented by the formula (II) wherein $R^3$ is an alkyl group having 1 to 7 carbon atoms, $CH_2$=CH—, $CH_3$—CH=CH—, $CH_2$=CH—$CH_2$—$CH_2$—, $CH_3$—$CH_2$—$CH_2$—CH=CH— or $CH_3$—CH=CH—$CH_2$—$CH_2$—, a compound represented by the formula (III) wherein $R^4$ is an alkyl group or an alkoxy group having 1 to 7 carbon atoms, and $R^5$ is —CH=$CH_2$, —CH=CH—$CH_3$, —$CH_2$—$CH_2$—CH=$CH_2$, —$CH_2$—$CH_2$—CH=CH—$CH_3$, —CH=CH—$CH_2$—$CH_3$, —CH=CH—$CH_2$—$CH_2$—$CH_3$, —O—$CH_2$—CH=$CH_2$ or —O—$CH_2$—CH=CH—$CH_3$, a compound represented by the formula (IV-a) wherein $R^6$ is $CH_2$=CH—, $CH_3$—CH=CH— or $CH_2$=CH—$CH_2$—$CH_2$—, and $R^7$ is an alkyl group having 1 to 7 carbon atoms, a compound represented by the formula (IV-b) wherein $R^8$ is an alkyl group having 1 to 7 carbon atoms, and $R^9$ is —O—$CH_2$—CH=$CH_2$ or —O—$CH_2$—CH=CH—$CH_3$, a compound represented by the formula (IV-c) wherein $R^{10}$ is $CH_2$=CH—, $CH_3$—CH=CH—, $CH_2$=CH—$CH_2$—$CH_2$— or $CH_3$—CH=CH—$CH_2$—$CH_2$—, and $R^{11}$ is an alkyl group having 1 to 7 carbon atoms, a compound represented by the formula (IV-d) wherein $R^{12}$ is an alkyl group having 1 to 7 carbon atoms, and $R^{13}$ is an alkoxyalkyl group having 2 to 7 carbon atoms, a compound represented by the formula (V) wherein $R^{14}$ is an alkyl group having 1 to 7 carbon atoms, $CH_2$=CH—, $CH_3$—CH=CH—, $CH_2$=CH—$CH_2$—$CH_2$— or $CH_3$—CH=CH—$CH_2$—$CH_2$—, and X is a single bond or —COO—, a compound represented by the formula (VI) wherein $R^{15}$ is an alkoxyalkyl group having 2 to 7 carbon atoms, a compound represented by the formula (VII) wherein each of $R^{16}$ and $R^{17}$ is independently an alkyl group having 1 to 7 carbon atoms, and a compound represented by the formula (VIII) wherein $R^{18}$ is an alkyl group having 1 to 7 carbon atoms, $CH_2=CH—$, $CH_3—CH=CH—$, $CH_2=CH—CH_2—CH_2—$ or $CH_3—CH=CH—CH_2—CH_2—$, and $R^{19}$ is an alkyl group having 1 to 7 carbon atoms.

A liquid crystal display element of the present invention comprises the following constitution.

(7) A liquid crystal display element using a liquid crystal composition described in any one of the above-mentioned paragraphs (1) to (6).

BEST MODE FOR CARRYING OUT THE INVENTION

Next, compounds of the respective components constituting a liquid crystal composition of the present invention will be described.

A compound represented by the formula (I-a) or (I-b) constituting a first component of the liquid crystal composition according to the present invention has a very large positive dielectric anisotropy and a low voltage holding ratio. When this first component is added to another liquid crystal compound or liquid crystal composition, the threshold voltage and the voltage holding ratio of the liquid crystal composition can be lowered, and the dependence of the threshold voltage on temperature can also be reduced. These compounds represented by the formulae (I-a) and (I-b) can play an important role in providing the liquid crystal composition for realizing a uniform display screen without display unevenness in the present invention. The preferable compound represented by the formula (I-a) or (I-b) in the present invention is a compound represented by the formula (I-a) in which $R^1$ is an alkyl group having 1 to 7 carbon atoms, or a compound represented by the formula (I-b) in which $R^2$ is an alkyl group having 1 to 7 carbon atoms.

A compound represented by the formula (II) constituting a second component of the liquid crystal composition has a positive dielectric anisotropy and a very large elastic constant ratio ($K_{33}/K_{11}$). When this second component is added to another liquid crystal compound or liquid crystal composition, the elastic constant ratio ($K_{33}/K_{11}$) of the liquid crystal composition can be increased. This compound can play an important role in providing the liquid crystal composition having steep electro-optic properties in the present invention. The preferable compound represented by the formula (II) in the present invention is a compound represented by the formula (I-a) in which $R^3$ is an alkyl group having 1 to 7 carbon atoms, $CH_2=CH—$, $CH_3—CH=CH—$, $CH_2=CH—CH_2—CH_2—$, $CH_3—CH_2—CH_2—CH=CH—$ or $CH_3—CH=CH—CH_2—CH_2—$.

A compound represented by the formula (III) constituting a third component of the liquid crystal composition has a very low viscosity and a relatively large elastic constant ratio ($K_{33}/K_{11}$). When this third component is added to another liquid crystal compound or liquid crystal composition, the viscosity of the liquid crystal composition can be lowered and the elastic constant ratio ($K_{33}/K_{11}$) can be increased. This compound can play an important role in providing the liquid crystal composition for particularly realizing a high-speed response in the present invention. The preferable compound represented by the formula (III) in the present invention is a compound represented by the formula (III) wherein R is an alkyl group or an alkoxy group having 1 to 7 carbon atoms, and R is $—CH=CH_2$, $—CH=CH—CH_3$, $—CH_2—CH_2—CH=CH_2$, $—CH_2—CH_2—CH=CH—CH_3$, $—CH=CH—CH_2—CH_3$, $—CH=CH—CH_2—CH_2—CH_3$, $—O—CH_2—CH=CH_2$ or $—O—CH_2—CH=CH—CH_3$, and a particularly preferable compound represented by the formula (III) is a compound represented by the formula (III) wherein $R^4$ is an alkyl group having 1 to 7 carbon atoms, and $R^5$ is $—CH=CH_2$, $—CH=CH—CH_3$, $—CH_2—CH_2—CH=CH_2$, $—CH_2—CH_2—CH=CH—CH_3$, $—CH=CH—CH_2—CH_3$ or $—CH=CH—CH_2—CH_3$.

A compound represented by the formula (IV-a), (IV-b), (IV-c) or (IV-d) constituting a fourth component of the liquid crystal composition has a high NI transition temperature, a low viscosity, a relatively large elastic constant ratio ($K_{33}/K_{11}$) and a broad d/p margin. When this fourth component is added to another liquid crystal compound or liquid crystal composition, the NI transition temperature of the liquid crystal composition can be raised, the dependence of a threshold voltage on temperature can be reduced, the elastic constant ratio ($K_{33}/K_{11}$) of the liquid crystal composition can be increased, and the d/p margin can also be broadened. These compounds represented by the formulae (IV-a), (IV-b), (IV-c) or (IV-d) can play an important role in providing the liquid crystal composition having the particularly high NI transition temperature in the present invention. The preferable compound represented by the formula (IV-a), (IV-b), (IV-c) or (IV-d) in the present invention is a compound represented by the formula (IV-a) wherein $R^6$ is $CH_2=CH—$, $CH_3—CH=CH—$ or $CH_2=CH—CH_2—CH_2—$ and R is an alkyl group having 1 to 7 carbon atoms, a compound represented by the formula (IV-b) wherein $R^8$ is an alkyl group having 1 to 7 carbon atoms and $R^9$ is $—O—CH_2—CH=CH_2$ or $—O—CH_2—CH=CH—CH_3$, a compound represented by the formula (IV-c) wherein $R^{10}$ is $CH_2=CH—$, $CH_3—CH=CH—$, $CH_2=CH—CH_2—CH_2—$ or $CH_3—CH=CH—CH_2—CH_2—$ and $R^{11}$ is an alkyl group having 1 to 7 carbon atoms, or a compound represented by the formula (IV-d) wherein $R^{12}$ is an alkyl group having 1 to 7 carbon atoms and $R^{13}$ is an alkoxyalkyl group having 2 to 7 carbon atoms.

A compound represented by the formula (V) constituting a fifth component of the liquid crystal composition has a high NI transition temperature and the low dependence of a threshold voltage on temperature. When this fifth component is added to another liquid crystal compound or liquid crystal composition, the NI transition temperature of the liquid crystal composition can be raised, and the dependence of the threshold voltage on temperature can be reduced. This compound can play an important role in providing the liquid crystal composition for realizing a uniform display screen without display unevenness in the present invention. The preferable compound represented by the formula (V) in the present invention is a compound represented by the formula (V) wherein $R^{14}$ is an alkyl group having 1 to 7 carbon atoms, $CH_2=CH—$, $CH_3—CH=CH—$, $CH_2=CH—CH_2—CH_2—$ or $CH_3—CH=CH—CH_2—CH_2—$, and X is a single bond or $—COO—$.

A compound represented by the formula (VI) constituting a sixth component of the liquid crystal composition has a relatively large positive dielectric anisotropy and a broad d/p margin. When this sixth component is added to another liquid crystal compound or liquid crystal composition, the d/p margin of the liquid crystal composition can be broadened. This compound can play an important role to improve the yield of panel manufacture. The preferable compound represented by the formula (VI) in the present invention is a compound represented by the formula (VI) wherein $R^{15}$ is an alkoxyalkyl group having 2 to 7 carbon atoms, and the particularly preferable compound is a compound represented by the formula (VI) wherein $R^{15}$ is $CH_3OCH_2—$.

$CH_3OC_2H_4-$, $CH_3OC_3H_6-$, $CH_3OC_4H_8-$ or $CH_3OC_5H_{10}-$.

A compound represented by the formula (VII) constituting a seventh component of the liquid crystal composition has a relatively low viscosity and a large Δn. When this seventh component is added to another liquid crystal compound or liquid crystal composition, the Δn of the liquid crystal composition can be optionally adjusted, and the viscosity can be lowered. The preferable compound represented by the formula (VII) in the present invention is a compound represented by the formula (VII) wherein each of $R^{16}$ and $R^{17}$ is independently an alkyl group having 1 to 7 carbon atoms.

A compound represented by the formula (VIII) constituting an eighth component of the liquid crystal composition has a high NI transition temperature and a relatively large elastic constant ratio ($K_{33}/K_{11}$). When this eighth component is added to another liquid crystal compound or liquid crystal composition, the NI transition temperature of the liquid crystal composition can be raised, and the elastic constant ratio ($K_{33}/K_{11}$) can also be increased. The preferable compound represented by the formula (VIII) in the present invention is a compound represented by the formula (VIII) wherein $R^{18}$ is an alkyl group having 1 to 7 carbon atoms, $CH_2=CH-$, $CH_3-CH=CH-$, $CH_2=CH-CH_2-CH_2-$ or $CH_3-CH=CH-CH_2-CH_2-$ and $R^{19}$ is an alkyl group having 1 to 7 carbon atoms.

A mixing ratio of the compound represented by the formula (I-a) or (I-b) which is the first component in the liquid crystal composition of the present invention is preferably in the range of 1 to 15% with respect to the total weight of the liquid crystal composition. If the mixing ratio of the compound is less than 1% by weight, the reduction of the dependence of the threshold voltage on temperature which is a characteristic of the present invention cannot be achieved and the voltage holding ratio cannot be lowered, either. On the other hand, if it is more than 15% by weight, the viscosity of the obtained liquid crystal composition inconveniently increases.

A mixing ratio of the compound represented by the formula (II) which is the second component is preferably in the range of 8 to 40% with respect to the total weight of the liquid crystal composition. If the mixing ratio of the compound is less than 8% by weight, the increase in the value of the elastic constant ratio ($K_{33}/K_{11}$) which is a characteristic of the present invention cannot be achieved. On the other hand, if it is more than 40% by weight, the viscosity of the obtained liquid crystal composition inconveniently increases.

A mixing ratio of the compound represented by the formula (III) which is the third component is preferably in the range of 10 to 30% with respect to the total weight of the liquid crystal composition. If the mixing ratio of the compound is less than 10% by weight, the decrease in the viscosity which is a characteristic of the present invention cannot be achieved, and the value of the elastic constant ratio ($K_{33}/K_{11}$) cannot be increased, either. On the other hand, if it is more than 30% by weight, the threshold voltage of the obtained liquid crystal composition inconveniently increases.

A mixing ratio of the compound represented by the formula (IV-a), (IV-b), (IV-c) or (IV-d) which is the fourth component is preferably in the range of 10 to 45% with respect to the total weight of the liquid crystal composition. If the mixing ratio of the compound is less than 10% by weight, the rise of the NI transition temperature which is a characteristic of the present invention cannot be achieved, and the value of the elastic constant ratio ($K_{33}/K_{11}$) cannot be increased, either. On the other hand, if it is more than 45% by weight, the threshold voltage of the obtained liquid crystal composition inconveniently increases.

A mixing ratio of the compound represented by the formula (V) which is the fifth component is preferably in the range of 5 to 25% with respect to the total weight of the liquid crystal composition. If the mixing ratio of the compound is less than 5% by weight, the reduction of the dependence of the threshold voltage on temperature which is a characteristic of the present invention cannot be achieved. On the other hand, if it is more than 25% by weight, the viscosity of the obtained liquid crystal composition inconveniently increases.

A mixing ratio of the compound represented by the formula (VI) which is the sixth component is preferably in the range of 1 to 10% with respect to the total weight of the liquid crystal composition. If the mixing ratio of the compound is less than 1% by weight, the expansion of the d/p margin which is a characteristic of the present invention cannot be achieved. On the other hand, if it is more than 10% by weight, the viscosity of the obtained liquid crystal composition inconveniently increases.

A mixing ratio of the compound represented by the formula (VII) which is the seventh component is preferably in the range of 1 to 15% with respect to the total weight of the liquid crystal composition. If the mixing ratio of the compound is less than 1% by weight, the decrease in the viscosity which is a characteristic of the present invention cannot be achieved. On the other hand, if it is more than 15% by weight, the threshold voltage of the obtained liquid crystal composition inconveniently increases.

A mixing ratio of the compound represented by the formula (VIII) which is the eighth component is preferably in the range of 1 to 10% with respect to the total weight of the liquid crystal composition. If the mixing ratio of the compound is less than 1% by weight, the rise of the NI transition temperature which is a characteristic of the present invention cannot be achieved. On the other hand, if it is more than 10% by weight, the threshold voltage of the obtained liquid crystal composition inconveniently increases.

For the purpose of regulating the threshold voltage, the nematic phase temperature range, the Δn, the viscosity and the like of the obtained liquid crystal composition in compliance with the use purpose of the liquid crystal display element, compounds other than the compounds represented by the above-mentioned formulae (I-a) to (VIII) can be added to the liquid crystal composition of the present invention, so far as the objects of the present invention are not impaired. Examples of such other compounds include the following compounds:

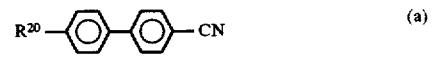
(a)

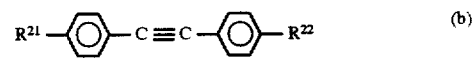
(b)

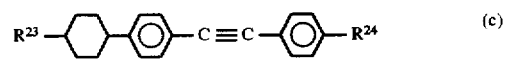
(c)

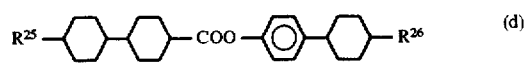
(d)

wherein $R^{20}$ is an alkyl group having 1 to 10 carbon atoms, each of $R^{21}$ and $R^{22}$ is independently an alkyl group or an alkoxy group having 1 to 10 carbon atoms, $R^{23}$ is an alkyl group having 1 to 10 carbon atoms, $R^{24}$ is an alkyl group or an alkoxy group having 1 to 10 carbon atoms, and each of $R^{25}$ and $R^{26}$ is independently an alkyl group having 1 to 10 carbon atoms.

EXAMPLES

Next, the present invention will be described in more detail with reference to examples, but the scope of the present invention should not be limited to these examples. It is to be noted that the amount of each component in these example means "% by weight". The abbreviations in the examples have the following meanings.

NI: Nematic-isotropic phase transition temperature (°C.)
η: Viscosity at 20° C. (mPa.s)
Vth: Threshold voltage (V) at 25° C.
Δn: Optical anisotropy at 25 C.
γ: Steepness $V_{90}/V_{10}$ at 25° C.
  ($V_{90}$: voltage at which transmittance is 90%,
  $V_{10}$: voltage at which transmittance is 10%)
τ: Response speed (msec) at 1/240 duty drive at 25° C.

Example 1

A liquid crystal composition comprising

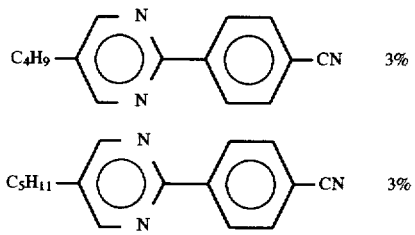

as first components [formula (I-a)]

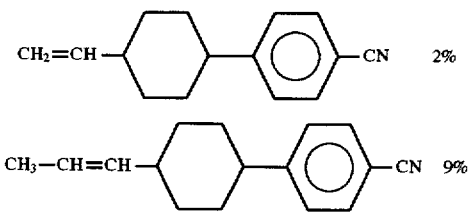

as second components [formula (II)]

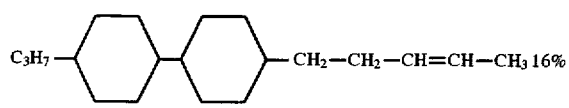

as a third component [formula (III)]

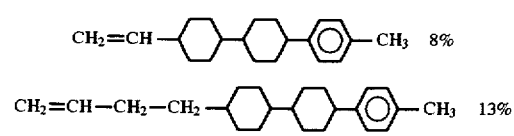

as fourth components [formula (IV-a)]

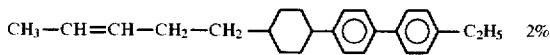

as a fourth component [formula (IV-c)]

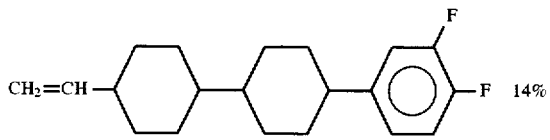

as a fifth component [formula (V)]

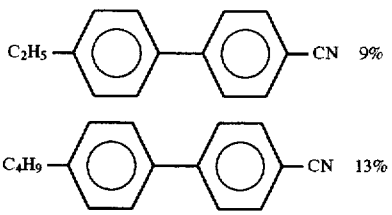

as other compounds

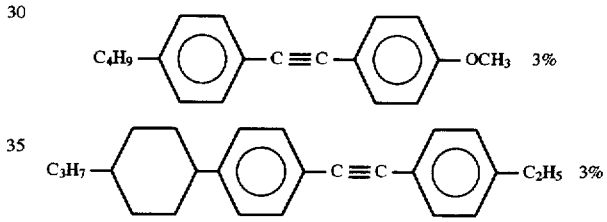

as other compounds

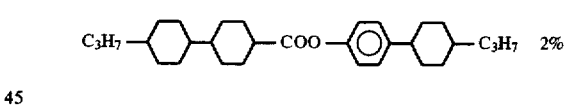

as another compound
had the following parameters:
  NI: 82.3° C.
  η: 23.6 mPa.s
  Vth: 2.00 V
  Δn: 0.140
  γ: 1.033

An STN display element having the following parameters:
  twist angle: 240°
  tilt angle: 40°
  d/p (cell thickness/pitch): 0.5
  d×Δn: 0.84 exerted a response time of 385 msec. Furthermore, the voltage holding ratio of the display element was 75%, and neither a display failure nor an after image phenomenon was observed.

Example 2

A liquid crystal composition comprising

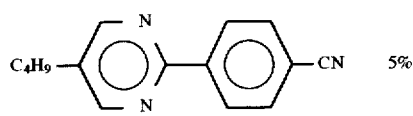 5%

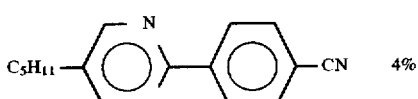 4% as first components [formula (I-a)]

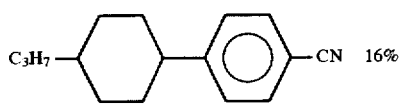 16% as a second component [formula (II)]

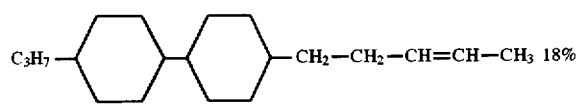 18% as a third component [formula (III)]

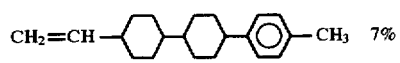 7%

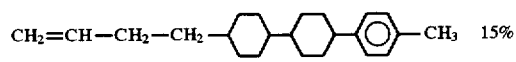 15% as fourth components [formula (IV-a)]

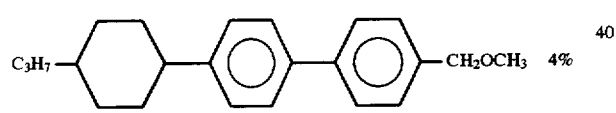 4% as a fourth component [formula (IV-d)]

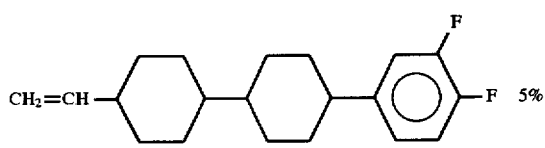 5%

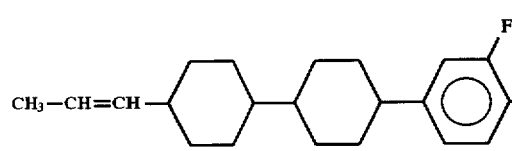 3% as fifth components [formula (V)]

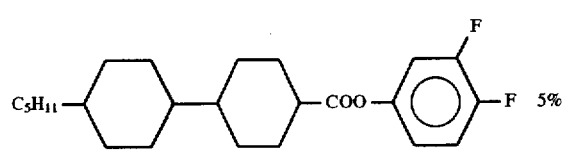 5%

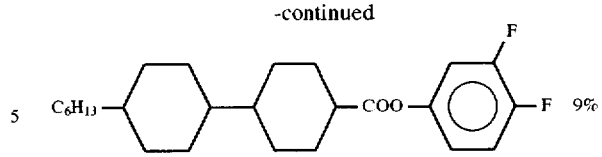 9% as fifth components [formula (V)]

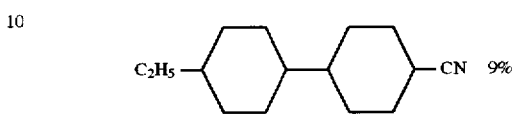 9% as another compound had the following parameters:
NI: 84.9° C.
η: 18.3 mPa.s
Vth: 2.00 V
Δn: 0.139
β: 1.042

An STN display element having the following parameters:
twist angle: 240°
tilt angle: 4°
d/p (cell thickness/pitch): 0.5
d×Δn: 0.83 exerted a response time of 290 msec. Furthermore, the voltage holding ratio of the display element was 65%, and neither a display failure nor an after image phenomenon was observed.

Example 3

A liquid crystal composition comprising

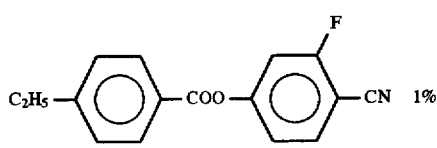 1%

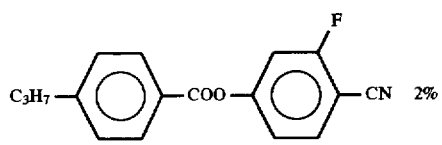 2% as first components [formula (I-b)]

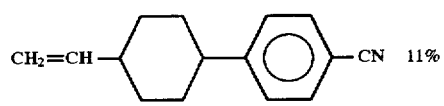 11%

 12%

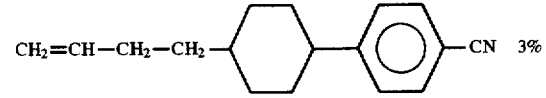 3% as second components [formula (II)]

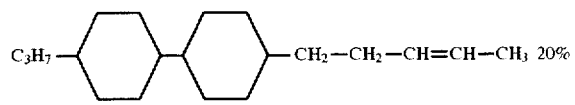 20% as a third component [formula (III)]

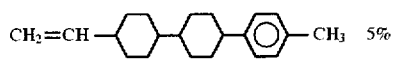 5%

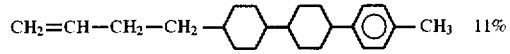 11% as fourth components [formula (IV-a)]

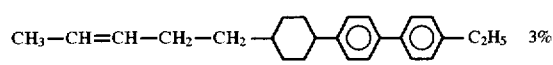 3% as a fourth component [formula (IV-c)]

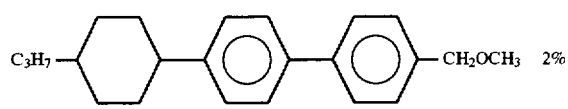 2% as a fourth component [formula (IV-d)]

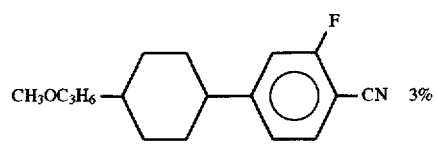 3% as a sixth component [formula (VI)]

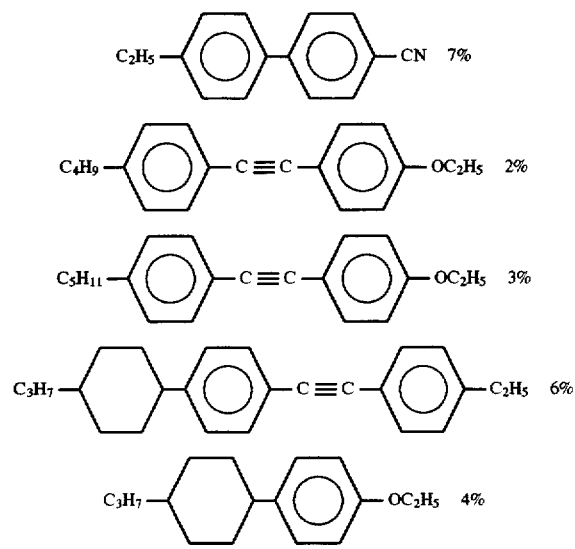

as other compounds
had the following parameters:
NI: 75.2° C.
η: 19.3 mPa.s
Vth: 2.02 V Δn: 0.136
γ: 1.043

An STN display element having the following parameters:
twist angle: 240°
tilt angle: 4°
d/p (cell thickness/pitch): 0.5
d×Δn: 0.82 exerted a response time of 247 msec. Furthermore, the voltage holding ratio of the display element was 70%, and neither a display failure nor an after image phenomenon was observed.

Example 4

A liquid crystal composition comprising

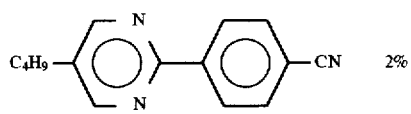 2% as a first component [formula (I-a)]

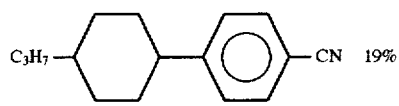 19%

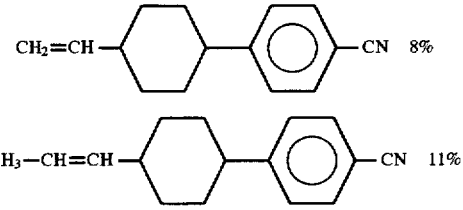 8%

11% as second components [formula (II)]

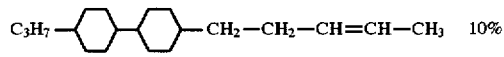 10%

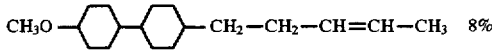 8% as third components [formula (III)]

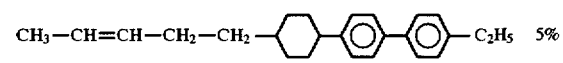 5% as a fourth component [formula (IV-c)]

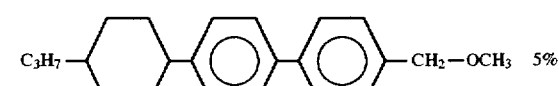 5%

 5% as fourth components [formula (IV-d)]

CH₃—CH=CH—[Cy]—[Cy]—[Pyr(N,N)]—C₅H₁₁  5%

CH₂=CH—CH₂—CH₂—[Cy]—[Cy]—[Pyr(N,N)]—C₅H₁₁  2% as eighth components [formula (VIII)]

C₂H₅—[Ph]—[Ph]—CN  2%

C₃H₇—[Ph]—C≡C—[Ph]—OC₂H₅  2%

C₄H₉—[Ph]—C≡C—[Ph]—OCH₃  1%

C₄H₉—[Ph]—C≡C—[Ph]—OC₂H₅  1%

C₅H₁₁—[Ph]—C≡C—[Ph]—OCH₃  2%

C₃H₇—[Cy]—[Ph]—C≡C—[Ph]—OC₂H₅  4%

C₃H₇—[Cy]—[Ph]—OC₄H₉  8% as other compounds had the following parameters:
NI: 85.2° C.
η: 18.7 mPa.s
Vth: 2.09 V
Δn: 0.137
γ: 1.045

An STN display element having the following parameters:

twist angle: 240° tilt angle: 4° d/p (cell thickness/pitch): 0.5 d×Δn: 0.82 exerted a response time of 320 msec. Furthermore, the voltage holding ratio of the display element was 75%, and neither a display failure nor an after image phenomenon was observed.

Example 5

A liquid crystal composition comprising

C₄H₉—[Pyr(N,N)]—[Ph]—CN  3% as a first component [formula (I-a)]

C₃H₇—[Ph]—COO—[Ph(F)]—CN  8% as a first component [formula (I-b)]

CH₂=CH—[Cy]—[Ph]—CN  6%

CH₃—CH=CH—[Cy]—[Ph]—CN  10% as second components [formula (II)]

C₃H₇—[Cy]—[Cy]—CH₂—CH₂—CH=CH—CH₃  8%

C₅H₁₁—[Cy]—[Cy]—CH=CH₂  12% as third components [formula (III)]

CH₂=CH—[Cy]—[Cy]—[Ph]—CH₃  5%

CH₂=CH—CH₂—CH₂—[Cy]—[Cy]—[Ph]—CH₃  8% as fourth components [formula (IV-a)]

C₃H₇—[Cy]—[Ph]—[Ph]—CH₂OCH₃  7% as a fourth component [formula (IV-d)]

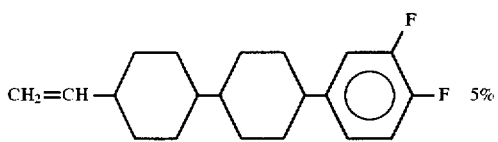 5%

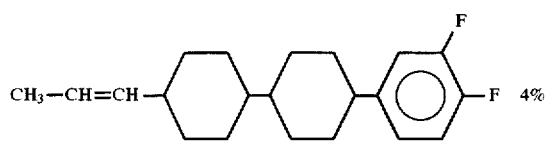 4% as fifth components [formula (V)]

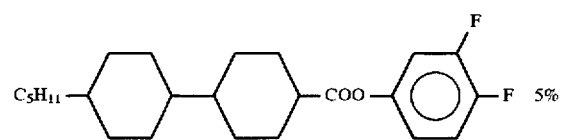 5% as a fifth component [formula (V)]

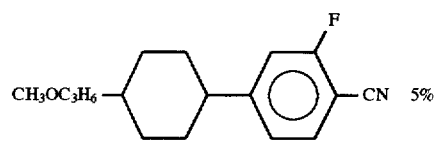 5% as a sixth component [formula (VI)]

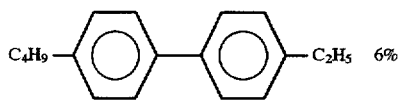 6% as a seventh component [formula (VII)]

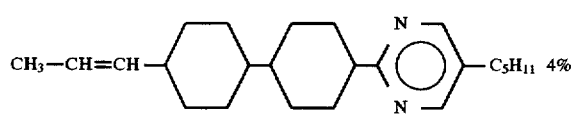 4% as an eighth component [formula (VIII)]

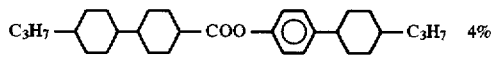 4% as another compound
had the following parameters:
NI: 100.5° C.
η: 18.7 mPa.s
Vth: 2.22 V
Δn: 0.133
γ: 1.045

An STN display element having the following parameters:
twist angle: 260°
tilt angle: 6°
d/p (cell thickness/pitch): 0.55
d×Δn: 0.8 exerted a response time of 295 msec. Furthermore, the voltage holding ratio of the display element was 68%, and neither a display failure nor an after image phenomenon was observed.

Example 6

A liquid crystal composition comprising

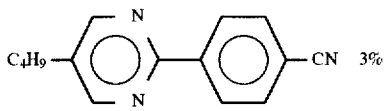 3% as a first component [formula (I-a)]

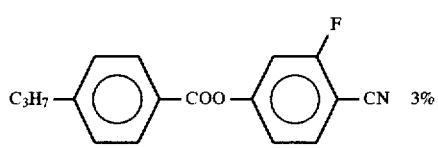 3% as a first component [formula (I-b)]

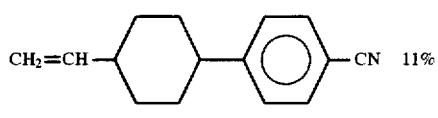 11%

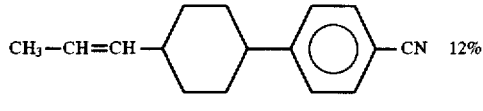 12%

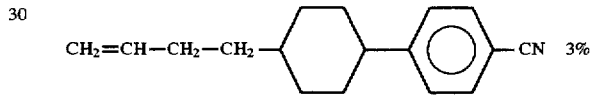 3% as second components [formula (II)]

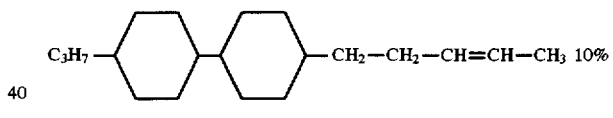 10%

 10% as third components [formula (III)]

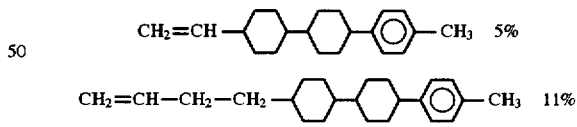 5%

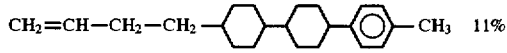 11% as fourth components [formula (IV-a)]

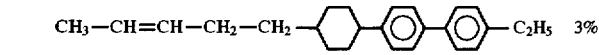 3% as a fourth component [formula (IV-c)]

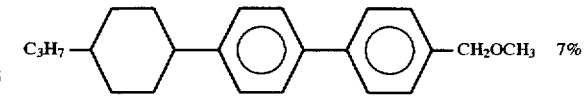 7% as a fourth component [formula (IV-d)]

C₂H₅—⌬—⌬—CN  7%

C₄H₉—⌬—C≡C—⌬—OC₂H₅  5%

C₃H₇—⬡—⌬—C≡C—⌬—C₂H₅  6%

C₃H₇—⬡—⌬—OC₂H₅  4% as other compounds
had the following parameters:
NI: 85.4° C.
η: 18.5 mPa.s
Vth: 1.99 V
Δn: 0.136
γ: 1.047

An STN display element having the following parameters:
twist angle: 240°
tilt angle: 4°
d/p (cell thickness/pitch): 0.5
d×Δn: 0.82 exerted a response time of 258 msec. Furthermore, the voltage holding ratio of the display element was 65%, and neither a display failure nor an after image phenomenon was observed.

Example 7

A liquid crystal composition comprising

C₄H₉—(pyrimidine)—⌬—CN  3%

C₅H₁₁—(pyrimidine)—⌬—CN  3% as first components [formula (I-a)]

C₂H₅—⌬—COO—⌬(F)—CN  2%

C₃H₇—⌬—COO—⌬(F)—CN  2%

C₄H₉—⌬—COO—⌬(F)—CN  2% as first components [formula (I-b)]

CH₂=CH—⬡—⌬—CN  12% as a second component [formula (II)]

C₅H₁₁—⬡—⬡—CH=CH₂  22% as a third component [formula (III)]

CH₂=CH—⬡—⬡—⌬—CH₃  7%

CH₂=CH—CH₂—CH₂—⬡—⬡—⌬—CH₃  15% as fourth components [formula (IV-a)]

C₃H₇—⬡—⬡—⌬—O—CH₂—CH=CH—CH₃  4% as a fourth component [formula (IV-b)]

CH₃—CH=CH—⬡—⌬—⌬—C₂H₅  7%

CH₃—CH=CH—CH₂—CH₂—⬡—⌬—⌬—C₂H₅  4% as a fourth component [formula (IV-c)]

C₄H₉—⌬—⌬—C₂H₅  11% as a seventh component [formula (VII)]

C₃H₇—⬡—⬡—COO—⌬—⬡—C₃H₇  3%

C₄H₉—⬡—⬡—COO—⌬—⬡—C₄H₉  3% as other compounds
had the following parameters:
NI: 100.3° C.
η: 17.1 mPa.s
Vth: 2.30 V
Δn: 0.134
γ: 1.047

An STN display element having the following parameters:
twist angle: 240° tilt angle: 4° d/p (cell thickness/pitch): 0.5 d×Δn: 0.82 exerted a response time of 288 msec. Furthermore, the voltage holding ratio of the display element was 65%, and neither a display failure nor an after image phenomenon was observed.

Example 8

A liquid crystal composition comprising

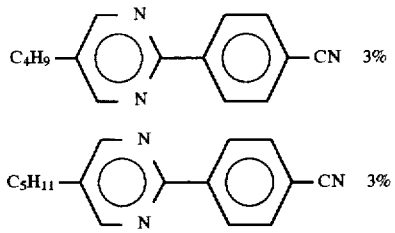

as first components [formula (I-a)]

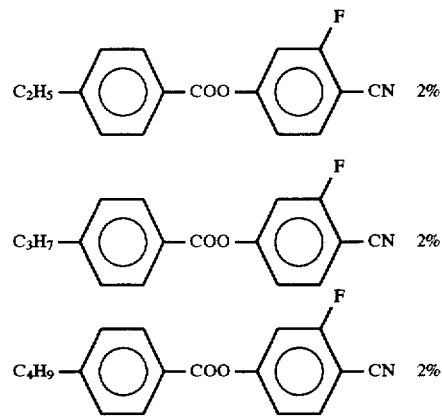

as first components [formula (I-b)]

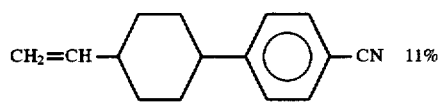

as a second component [formula (II)]

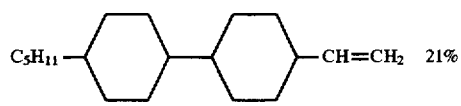

as a third component [formula (III)]

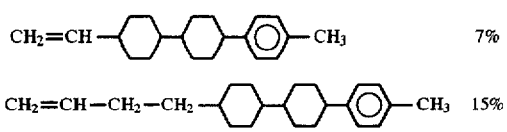

as fourth components [formula (IV-a)]

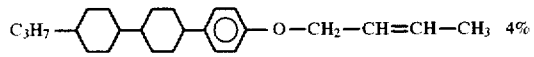

as a fourth component [formula (IV-b)]

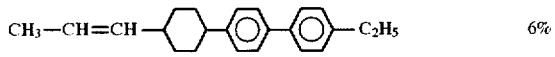
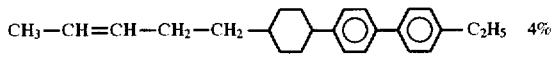

as a fourth component [formula (IV-c)]

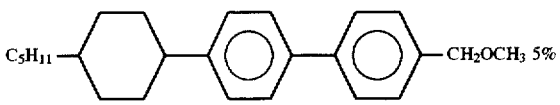

as a fourth component [formula (IV-d)]

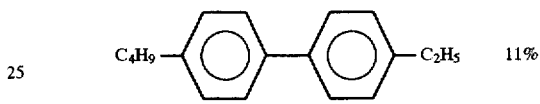

as a seventh component [formula (VII)]

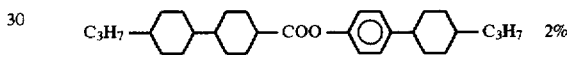
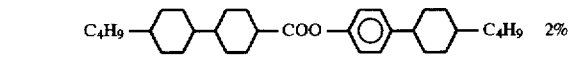

as other compounds had the following parameters:
NI: 103.8° C.
η: 18.2 mPa.s
Vth: 2.35 V
Δn: 0.136
βγ: 1.042

An STN display element having the following parameters:

twist angle: 260° tilt angle: 6° d/p (cell thickness/pitch): 0.55 d×Δn: 0.82 exerted a response time of 277 msec. Furthermore, the voltage holding ratio of the display element was 63%, and neither a display failure nor an after image phenomenon was observed.

Possibility of Industrial Utilization

According to the present invention, a liquid crystal composition having steep electro-optic properties and a low viscosity can be obtained, and thus, there can be provided an STN system liquid crystal display element which is equipped with a uniform display screen having a high contrast and a high-speed response and not having any display unevenness and which enables a high manufacture yield.

We claim:

1. A liquid crystal composition which comprises 1 to 15% by weight of at least one compound as a first component selected from the group consisting of compounds represented by the formulae (I-a) and (I-b)

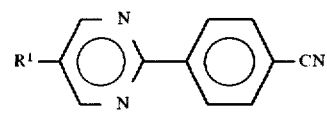
(I-a)

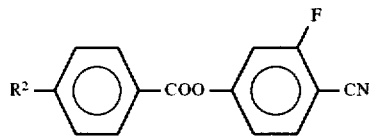
(I-b)

wherein each of $R^1$ and $R^2$ is an alkyl group having 1 to 10 carbon atoms.

8 to 40% by weight of at least one compound as a second component selected from the group consisting of compounds represented by the formula (II)

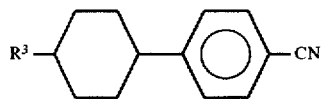
(II)

wherein $R^3$ is an alkyl group having 1 to 10 carbon atoms or an alkenyl group having 2 to 10 carbon atoms, 10 to 30% by weight of at least one compound as a third component selected from the group consisting of compounds represented by the formula (III)

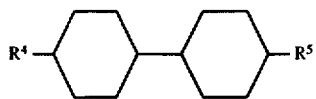
(III)

wherein $R^4$ is an alkyl group or an alkoxy group having 1 to 10 carbon atoms, and $R^5$ is an alkenyl group or an alkenyloxy group having 2 to 10 carbon atoms, and 10 to 45% by weight of at least one compound as a fourth component selected from the group consisting of compounds represented by the formulae (IV-a), (IV-b), (IV-c) and (IV-d)

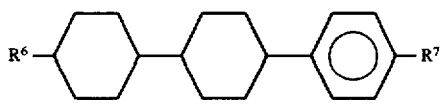
(IV-a)

wherein $R^6$ is an alkenyl group having 2 to 10 carbon atoms, and $R^7$ is an alkyl group or an alkoxy group having 1 to 10 carbon atoms,

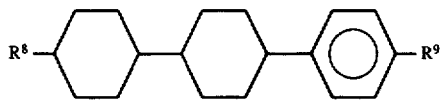
(IV-b)

wherein $R^8$ is an alkyl group having 1 to 10 carbon atoms, and $R^9$ is an alkenyl group or an alkenyloxy group having 2 to 10 carbon atoms,

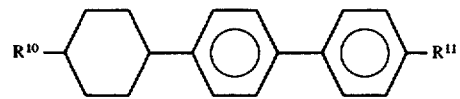
(IV-c)

wherein $R^{10}$ is an alkenyl group having 2 to 10 carbon atoms, and $R^{11}$ is an alkyl group or an alkoxy group having 1 to 10 carbon atoms,

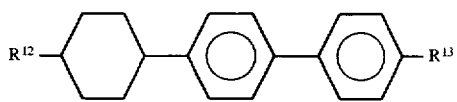
(IV-d)

wherein $R^{12}$ is an alkyl group having 1 to 10 carbon atoms, and $R^{13}$ is an alkoxyalkyl group having 2 to 10 carbon atoms.

2. The liquid crystal composition according to claim 1 which further comprises 5 to 25% by weight of at least one compound as a fifth component selected from the group consisting of compounds represented by the formula (V)

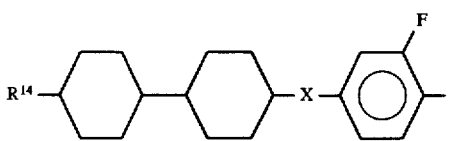
(V)

wherein $R^{14}$ is an alkyl group having 1 to 10 carbon atoms or an alkenyl group having 2 to 10 carbon atoms, and X is a single bond or —COO—.

3. The liquid crystal composition according to claim 1 or 2 which further comprises 1 to 10% by weight of at least one compound selected from the group consisting of compounds represented by the formula (VI)

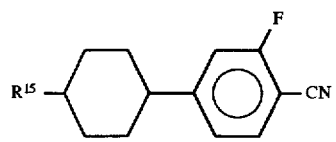
(VI)

wherein $R^{15}$ is an alkoxyalkyl group having 2 to 10 carbon atoms.

4. The liquid crystal composition according to claim 1 or 2 which further comprises 1 to 15% by weight of at least one compound selected from the group consisting of compounds represented by the formula (VII)

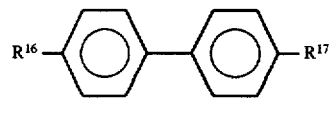
(VII)

wherein each of $R^{16}$ and $R^{17}$ is independently an alkyl group or an alkoxy group having 1 to 10 carbon atoms or an alkenyl group having 2 to 10 carbon atoms.

5. The liquid crystal composition according to claim 1 or 2 which further comprises 1 to 10% by weight of at least one compound selected from the group consisting of compounds represented by the formula (VIII)

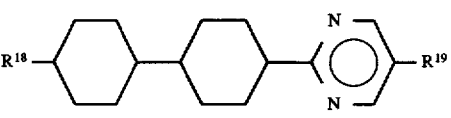
(VIII)

wherein $R^{18}$ is an alkyl group having 1 to 10 carbon atoms or an alkenyl group having 2 to 10 carbon atoms, and $R^{19}$ is an alkyl group having 1 to 10 carbon atoms.

6. The liquid crystal composition according to claim 3 which further comprises 1 to 15% by weight of at least one compound selected from the group consisting of compounds represented by the formula (VII)

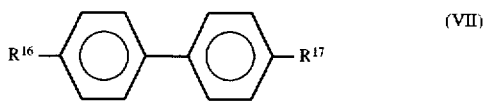

(VII)

wherein each of $R^{16}$ and $R^{17}$ is independently an alkyl group or an alkoxy group having 1 to 10 carbon atoms or an alkenyl group having 2 to 10 carbon atoms.

7. The liquid crystal composition according to claim 3 which further comprises 1 to 10% by weight of at least one compound selected from the group consisting of compounds represented by the formula (VIII)

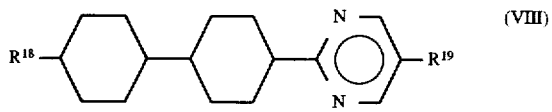

(VIII)

wherein $R^{18}$ is an alkyl group having 1 to 10 carbon atoms or an alkenyl group having 2 to 10 carbon atoms, and $R^{19}$ is an alkyl group having 1 to 10 carbon atoms.

8. The liquid crystal composition according to claim 4 which further comprises 1 to 10% by weight of at least one compound selected from the group consisting of compounds represented by the formula (VIII)

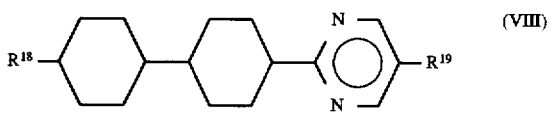

(VIII)

wherein $R^{18}$ is an alkyl group having 1 to 10 carbon atoms or an alkenyl group having 2 to 10 carbon atoms, and $R^{19}$ is an alkyl group having 1 to 10 carbon atoms.

9. The liquid crystal composition according to claim 1 which comprises a compound represented by the formula (I-a) wherein $R^1$ is an alkyl group having 1 to 7 carbon atoms, a compound represented by the formula (I-b) wherein $R^2$ is an alkyl group having 1 to 7 carbon atoms, a compound represented by the formula (II) wherein $R^3$ is an alkyl group having 1 to 7 carbon atoms, $CH_2=CH-$, $CH_3-CH=CH-$, $CH_2=CH-CH_2-CH_2-$, $CH_3-CH_2-CH_2-CH=CH-$ or $CH_3-CH=CH-CH_2-CH_2-$, a compound represented by the formula (III) wherein $R^4$ is an alkyl group or an alkoxy group having 1 to 7 carbon atoms, and $R^5$ is $-CH=CH_2$, $-CH=CH-CH_3$, $-CH_2-CH_2-CH=CH_2$, $-CH_2-CH_2-CH=CH-CH_3$, $-CH=CH-CH_2-CH_3$, $-CH=CH-CH_2-CH_2-CH_3$, $-O-CH_2-CH=CH_2$ or $-O-CH_2-CH=CH-CH_3$, a compound represented by the formula (IV-a) wherein $R^6$ is $CH_2=CH-$, $CH_3-CH=CH-$ or $CH_2=CH-CH_2-CH_2-$, and $R^7$ is an alkyl group having 1 to 7 carbon atoms, a compound represented by the formula (IV-b) wherein $R^8$ is an alkyl group having 1 to 7 carbon atoms, and $R^9$ is $-O-CH_2-CH=CH_2$ or $-O-CH_2-CH=CH-CH_3$, a compound represented by the formula (IV-c) wherein $R^{10}$ is $CH_2=CH-$, $CH_3-CH=CH-$, $CH_2=CH-CH_2-CH_2-$ or $CH_3-CH=CH-CH_2-CH_2-$, and $R^{11}$ is an alkyl group having 1 to 7 carbon atoms, a compound represented by the formula (IV-d) wherein $R^{12}$ is an alkyl group having 1 to 7 carbon atoms, and $R^{13}$ is an alkoxyalkyl group having 2 to 7 carbon atoms, and further comprising 5 to 25% by weight of a compound represented by the formula (V)

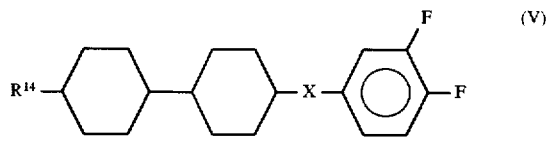

(V)

wherein $R^{14}$ is an alkyl group having 1 to 7 carbon atoms, $CH_2=CH-$, $CH_3-CH=CH-$, $CH_2=CH-CH_2-CH_2-$ or $CH_3-CH=CH-CH_2-CH_2-$, and X is a single bond or $-COO-$, 1 to 10% by weight of a compound represented by the formula (VI)

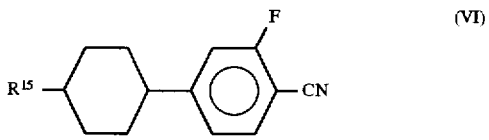

(VI)

wherein $R^{15}$ is an alkoxyalkyl group having 2 to 7 carbon atoms, 1 to 15% by weight of a compound represented by the formula (VII)

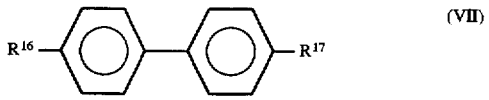

(VII)

wherein each of $R^{16}$ and $R^{17}$ is independently an alkyl group having 1 to 7 carbon atoms, and 1 to 10% by weight of a compound represented by the formula (VIII)

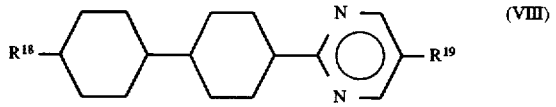

(VIII)

wherein $R^{18}$ is an alkyl group having 1 to 7 carbon atoms, $CH_2=CH-$, $CH_3-CH=CH-$, $CH_2=CH-CH_2-CH_2-$ or $CH_3-CH=CH-CH_2-CH_2-$, and $R^{19}$ is an alkyl group having 1 to 7 carbon atoms.

10. A liquid crystal display element which comprises a liquid crystal composition described in any one of claims 1, 2 or 9.

11. A liquid crystal display element which comprises a liquid crystal composition described in claim 3.

12. A liquid crystal display element which comprises a liquid crystal composition described in claim 4.

13. A liquid crystal display element which comprises a liquid crystal composition described in claim 5.

14. A liquid crystal display element which comprises a liquid crystal composition described in claim 6.

15. A liquid crystal display element which comprises a liquid crystal composition described in claim 7.

16. A liquid crystal display element which comprises a liquid crystal composition described in claim 8.

* * * * *